UNITED STATES PATENT OFFICE.

THOMAS HOLLIDAY AND ROBERT HOLLIDAY, OF HUDDERSFIELD, COUNTY OF YORK, ENGLAND.

DYEING COLORS ON COTTON OR TEXTILE FABRICS.

SPECIFICATION forming part of Letters Patent No. 241,661, dated May 17, 1881.

Application filed September 11, 1880. (Specimens.) Patented in England July 6, 1880.

*To all whom it may concern:*

Be it known that we, THOMAS HOLLIDAY and ROBERT HOLLIDAY, subjects of the Queen of Great Britain and Ireland, both residing at Huddersfield, in the county of York, England, have invented certain new and useful Improvements in Dyeing Various Colors on Cotton and other Textile Fabrics, (for which we have received provisional protection in our application for Letters Patent in England, No. 2,757, dated July 6, 1880;) and we do hereby declare that the following is a full, clear, and exact description of the invention, which will enable others skilled in the art to which it appertains to make and use the same.

Our invention consists in forming on the fiber direct azo colors produced by the action of the phenols—such as alpha-naphthol, beta-naphthol, dioxy-naphthaline, phenol, cresol, &c.—upon the diazo compounds obtained from aniline, the toluidines, xylidines, naphthylamines, and other aromatic amines, either simple or substituted, or from the monatomic phenols, either simple or substituted.

To carry this invention into effect, employing on the one hand beta-naphthol and on the other hand the diazo compound prepared from aniline, we take an alkaline solution of beta-naphthol, made by dissolving five parts of beta-naphthol in one hundred parts of water containing three parts of caustic soda, (seventy per cent.) The fiber is impregnated with this solution and then submitted to the action of the solution of the diazo compound from aniline, prepared by mixing one part of aniline, two parts of muriatic acid, (20° Baumé,) one hundred parts of water, and ten parts of an aqueous solution of nitrite of soda, (30° Baumé.) The orange color is immediately developed in the fiber.

To make the result attainable with greater certainty it may be desirable in some cases to subject the dyed fabric or cloth to a further excess of alkali—say ammonia.

The order of procedure may be varied without changing the result. For example, the diazo solution may be applied first, and the beta-naphthol immediately thereafter, before the diazo solution becomes decomposed; or the diazo compound can be formed directly on the fiber, either before or after the application of the beta-naphthol solution; or the diazo compound can be formed at the same time that the beta-naphthol solution is applied by first impregnating the fiber with the aniline salt and then submitting it to an alkaline solution containing the beta-naphthol and the nitrite of soda; or, finally, the diazo compound may be mixed with or formed in a solution or mixture of naphthol and applied to the fiber immediately, the color being at once obtained by the application of an alkali, for which purpose ammonia may be used.

It is obvious that it is not necessary to use those particular agents named for producing the solutions or the diazo compounds, as other alkalies, acids, and nitrites may be substituted without changing the nature of our invention, as would be known to any person skilled in the chemical manipulation of azo colors and the materials used in producing them, since our invention consists in the fixation of the color upon the fiber by the method herein stated; nor do we confine ourselves to the exact proportions, as they may be varied without affecting the results, though they should approximate to the chemical equivalents of the aromatic agents employed.

We also produce valuable results by using two or more phenols or two or more diazo compounds at the same time, thus obtaining intermediate shades of color.

It is also evident that this invention can be applied to printing as well as to dyeing.

We are aware that azo colors produced by the action of phenols upon diazo compounds of the aromatic amines and other substances mentioned herein have been manufactured and used, and such we do not broadly claim, our invention being limited to the production of a class of colors, previously known to exist, upon textile fabrics in the manner stated.

Having thus fully described our said invention and the manner of carrying the same into effect, what we claim, and desire to secure by Letters Patent, is—

1. The direct production of azo colors upon cotton and other textile fabrics by the action of phenols upon diazo compounds of the aromatic amines or of phenols.

2. The within-described process for developing an azo color directly in or upon a textile fiber, yarn, or cloth, whether knit or woven, by impregnating the said fiber, yarn, or cloth with a solution of a phenol or phenols, and with a solution of a diazo compound of an aromatic amine or phenol, substantially as described.

3. As a new article of manufacture, textile fiber, yarn, or cloth, whether knit or woven, having an azo color developed in or upon the same by the action of phenols upon diazo compounds of the aromatic amines or phenols, and readily distinguishable from fiber, yarn, or cloth colored by azo colors formed previously to their application on said fiber, &c., by the greater fastness of the colors and by the absence of sulphonation.

In testimony whereof we have signed our names to this specification in the presence of two subscribing witnesses.

THOMAS HOLLIDAY.
ROBERT HOLLIDAY.

Witnesses to the signature of Thomas Holliday:
WILLIAM BROOKES,
ALFRED GEORGE BROOKES.

Witnesses to the signature of Robert Holliday:
WILLIAM HEPPENSTALL,
HARRY HEPPENSTALL.